(No Model.)

R. WOOD.
THERMOSTATIC SPRINKLER.

No. 499,180. Patented June 6, 1893.

WITNESSES:

INVENTOR
Robert Wood
By Smith & Denison
ATTORNEYS.

UNITED STATES PATENT OFFICE.

ROBERT WOOD, OF SYRACUSE, NEW YORK, ASSIGNOR TO THE UNITED STATES AUTOMATIC SPRINKLER COMPANY, OF CHICAGO, ILLINOIS.

THERMOSTATIC SPRINKLER.

SPECIFICATION forming part of Letters Patent No. 499,180, dated June 6, 1893.

Application filed December 19 1892. Serial No. 455,597. (No model.)

*To all whom it may concern:*

Be it known that I, ROBERT WOOD, of Syracuse, in the county of Onondaga, in the State of New York, have invented new and useful Improvements in Thermostatic Sprinklers, of which the following, taken in connection with the accompanying drawings, is a full, clear, and exact description.

My invention relates to piping systems in connection with sprinkling apparatus for the extinguishment of fires. A dry pipe sprinkling apparatus usually comprises an automatic valve connected to the water main, a main stand-pipe or distributing pipe connected to said valve casing, lateral pipes connected to said stand-pipes and provided with sprinkler attachments, thermostatic in their operation, and said valve being provided with an auxiliary valve chamber arranged so that the stem of the valve therein, by its engagement with a system of connected levers operated through the pressure upon the valve, to hold the main supply valve closed, so long as a given amount of pressure is maintained; and my object is to connect said auxiliary valve chamber to the stand pipe by piping connected to this chamber at one end, and at the other to the stand-pipe or other pipes above what I term a possible, "water column level," in a dry-pipe system, in order to prevent the formation of such a water column bearing upon the auxiliary valve, with sufficient weight or pressure as to prevent the operation of the valve, and the letting-on of the water when the pressure in the piping system is reduced, and when the water is needed to extinguish a fire.

My invention consists in the several novel features of construction and operation hereinafter described and which are specifically set forth in the claims hereunto annexed.

It is constructed as follows, reference being had to the accompanying drawings, in which—

Figure 1:
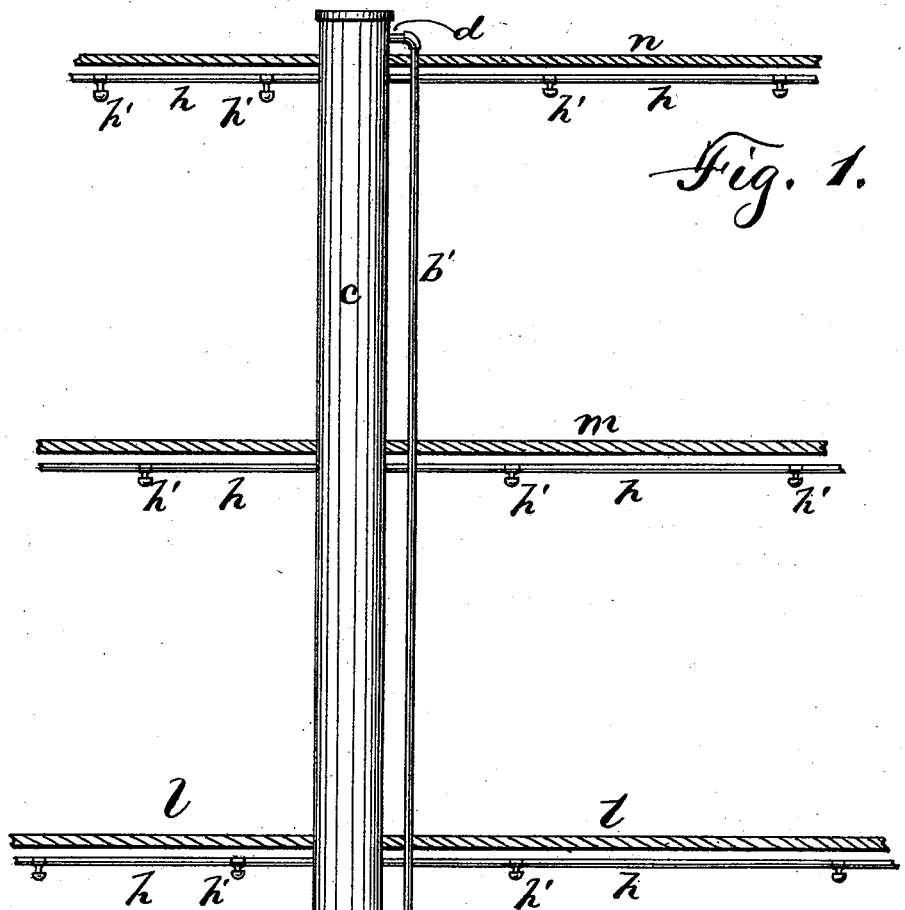
Figure 2:
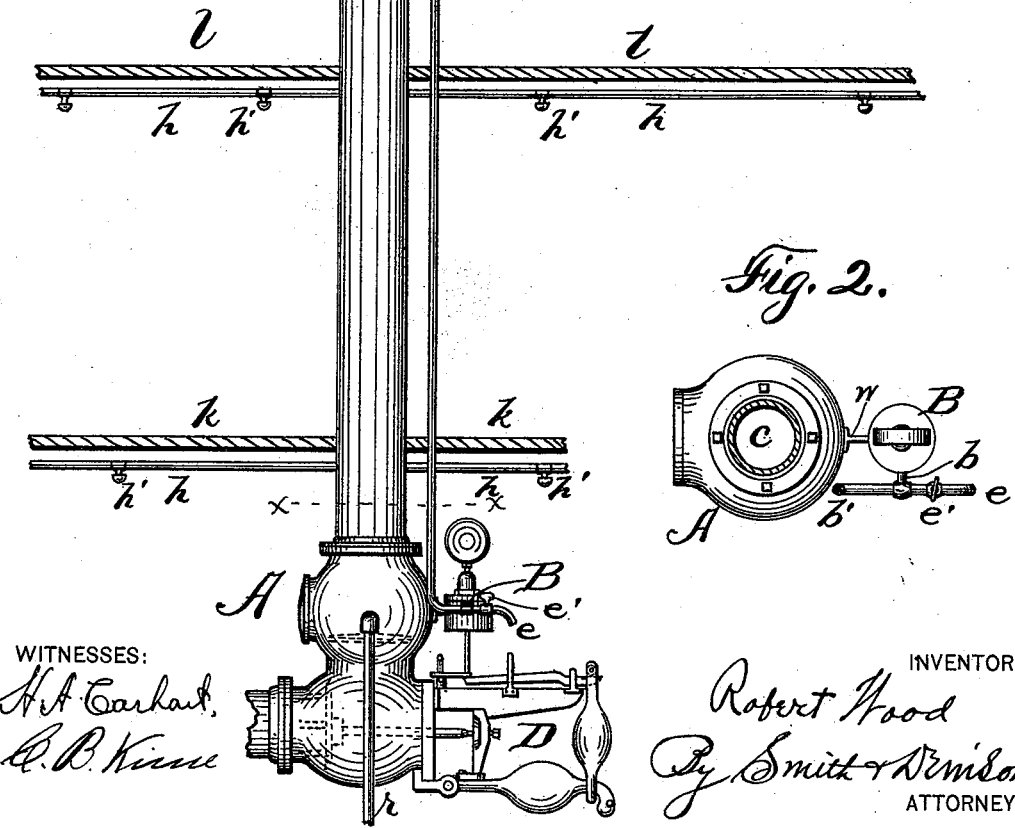

Figure 1, is a side elevation of my apparatus applied to a building. Fig. 2, is a transverse section thereof, on line $x\ x$.

Inasmuch as this invention is, in one sense, an improvement upon the automatic valve heretofore patented to me, March 15, 1892, No. 470,735, I will not fully describe the automatic valve —A— here shown, nor its connected levers and weights —D— co-operating to hold the main inlet-valve closed, through the pressure exerted upon the lever system through the stem —a— of the valve in the auxiliary chamber —B—, such pressure primarily bearing upon said auxiliary valve. In the present construction the auxiliary chamber is not connected to the main valve chamber, but it is provided with an auxiliary pipe —b— let into its side, above the valve therein, and thence by an extension —b'— is carried up to the top or less distance of the main stand pipe, or distributing pipe —c—, and thereto connected as at —d—. This auxiliary pipe is also provided with an extension —e— in which a try-cock —e'— is mounted. To the stand-pipe the branch pipes —h—h— are connected and —h'— are sprinklers of any ordinary thermostatic construction connected to said branches. The stand-pipe is also shown as connected to the top of the valve chamber, and thence extending vertically through the four (or more) floors, k, l, m, n of a building. The automatic valve is also provided with a draw-off pipe —r— having a suitable shut-off valve (not shown) by means of which the water in the piping can be drawn off, from the piping system, comprising the stand-pipe and its branches, whenever desired, as after a fire has been put out and it is desired to re-charge the piping system with compressed air. But in the construction shown in said Letters Patent, the water will adhere to the piping so that after the shut-off is closed, and the air pressure is again applied to the piping system, the water so remaining in the piping will collect in the main-valve chamber, in the auxiliary chamber and in the stand-pipe, until it has formed a water column on top of the main valve, sufficient in weight and force of pressure to prevent the operation of said auxiliary valve to release and open the main-valve when the air pressure in the piping system is reduced, from any cause, so that it would be desirable to have the main valve opened and the water let into the piping system; and inasmuch as the pipe —b—b'—d— is connected to the upper part of the stand-pipe, and at a point above that of any possible water column, the auxiliary valve is only subjected to the air pressure, normal to the piping system, and it will therefore always operate to release and open the main-valve, even though a water column has formed in the stand-pipe.

The try-cock is operated to determine whether there is any water in the auxiliary pipe, and to draw, or blow it out, and when no water shows in its discharge this pipe is free from water. A bracket —w— connects the auxiliary chamber to the valve casing and supports it. It will be seen that this auxiliary pipe can also be connected to any other valve chamber, in which the creation of a water column is possible or feared, which may tend, or at least, to hinder or prevent the operation of the valve at the proper time. It will be further seen that the auxiliary pipe, operates to prevent the formation of a water column therein, and further operates to establish a direct connection between the stand-pipe and the auxiliary valve chamber, and to maintain the air pressure upon the auxiliary valve, unobstructed, so as to insure prompt action, whenever the air pressure in the stand-pipe, its branches and the auxiliary pipe is reduced, from any cause, to certain degree below the predetermined standard.

What I claim as my invention, and desire to secure by Letters Patent, is—

1. The combination with an automatic valve, and the stand pipe connected thereto, of an auxiliary valve-chamber, and an auxiliary pipe connected thereto, and to the stand-pipe adjacent to its top.

2. The combination with an automatic valve, and the stand-pipe connected thereto, of an auxiliary valve chamber, an auxiliary pipe connected thereto and to the stand-pipe near its top, and a try-cock mounted in an extension of said pipe adjacent to said auxiliary valve chamber.

In witness whereof I have hereunto set my hand this 17th day of December, 1892.

ROBERT WOOD.

In presence of—
C. W. SMITH,
HOWARD P. DENISON.